UNITED STATES PATENT OFFICE.

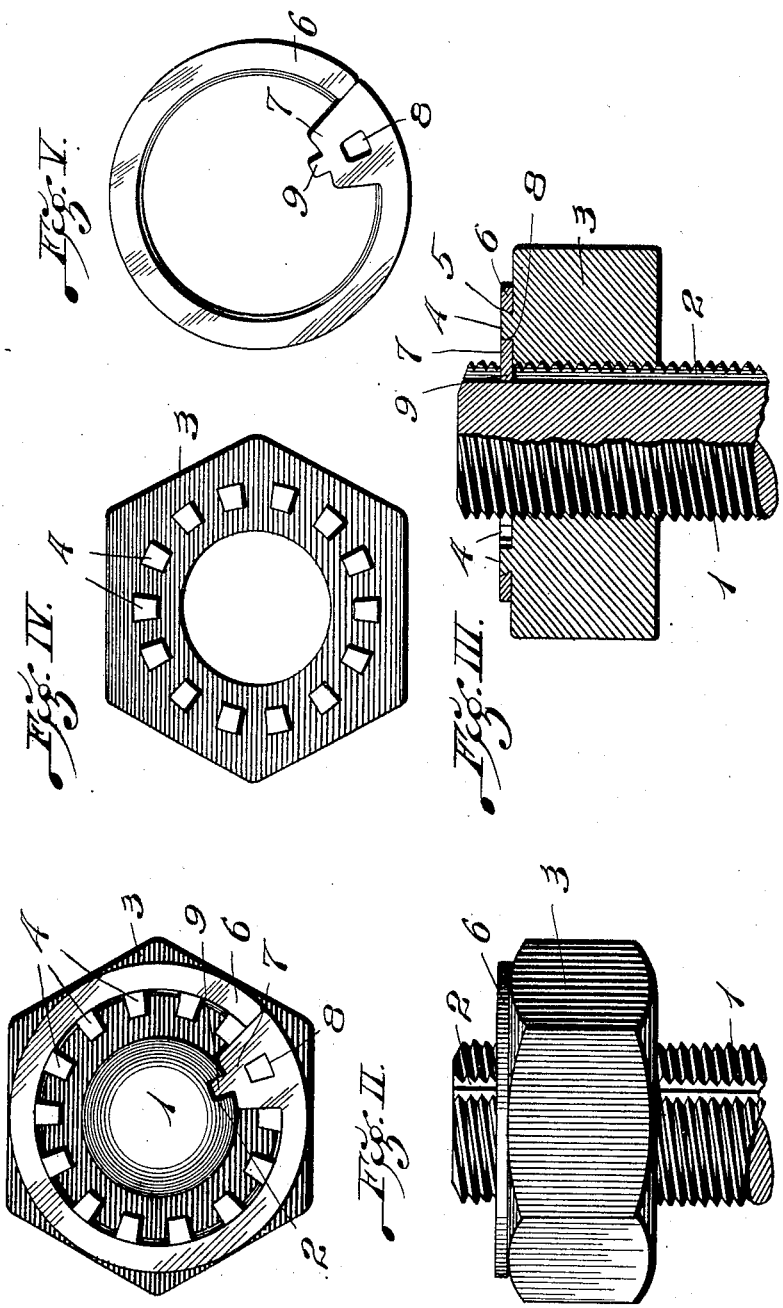

ALEXANDER E. ZEESE, OF ST. LOUIS, MISSOURI.

NUT-LOCK.

No. 925,067.  Specification of Letters Patent.  Patented June 15, 1909.

Application filed March 18, 1909. Serial No. 484,146.

*To all whom it may concern:*

Be it known that I, ALEXANDER E. ZEESE, a citizen of the United States of America, residing in the city of St. Louis and State of Missouri, have invented certain new and useful Improvements in Nut-Locks, of which the following is a full, clear, and exact description, reference being had to the accompanying drawings, forming part of this specification.

My invention relates to nut locks, and it has for its object the production of a nut lock by which a nut may be held from rotation upon a bolt or other screw threaded object and which permits of a nicety of adjustment of the nut before the locking member is applied thereto in order that the nut may be held in the precise position to which it is desired to adjust and retain it.

Figure I is an end view of my nut lock. Fig. II is a side elevation of the nut lock. Fig. III is a longitudinal section. Fig. IV is an end view of the nut used in my nut lock. Fig. V is a face view of the nut locking ring.

In the accompanying drawings: 1 designates a screw threaded member, such for instance, as the shank of a bolt or the stem of an axle spindle and which is provided with a longitudinal groove 2.

3 designates a nut applied to the member 1 and which may be in the main of any desired configuration. This nut is provided at its outer end and externally thereof with studs 4 extending in a circular series, and located intermediate of the hole in the nut and the outer edge of the nut. The studs 4 have beveled outer faces 5, as seen in Fig. III.

6 designates a split spring locking ring, preferably of steel, that is applied to the nut 3 and encircles the series of studs upon the nut, the locking ring being beveled at its inner edge to provide for its engagement with the beveled outer faces of the studs 4 which extend inwardly toward the center of the nut and serve to prevent slippage of the locking ring from engagement with said studs. At one end of the split locking ring is a head 7 that is of sufficient dimensions to extend from the outer edge of the ring to a point near the hole in the nut 3. The head of the ring is provided with a central aperture 8 that is adapted to receive either of the studs 4 on the nut when the locking ring is applied to the nut, and said head is of sufficient width to cause its side edges to bear against the sides of two of the studs adjoining that which enters into the aperture 8 in the head in order that the head will be firmly held between the studs at the sides thereof while it is fitted to the stud that passes therethrough. At the inner end of the head of the locking ring is a tooth 9 that enters into the longitudinal groove in the shank of a bolt or other threaded member 1 when the locking ring is fitted to the studs of the nut, as explained.

It will be seen from the foregoing that the nut 3 may be adjusted to any desired degree upon the threaded member and that when either of the studs upon the nut is brought into alinement with said groove, the locking ring may be applied to said studs to encircle them and with the head of the ring opposite the groove so that when said head is fitted to the stud that is opposite the groove and between the two studs adjoining the first stud at each side thereof, the locking ring will be held to the nut and the tooth 9 of its head having entered into the groove will act to restrain the nut from rotation upon the threaded member. The locking ring being of spring material and being beveled at its inner edge for engagement with the beveled outer faces of the studs of the nut, is held in close fitting engagement with said studs and there is, therefore, no liability of dislodgment of the locking ring from the studs.

I claim:—

1. The combination with a threaded member provided with a longitudinal groove, of a nut having studs located externally thereof at its outer end, a split spring locking ring having a head at one end provided with an aperture receiving one of said studs and with a tooth entering into the groove in said threaded member, said head being of a width to permit of its bearing against one of the next adjacent studs at each side of the stud extending through the head.

2. The combination with a threaded member provided with a longitudinal groove, of a nut having studs located externally thereof at its outer end, a split spring locking ring having a head at one end provided with an aperture receiving one of said studs and with a tooth entering into the groove in said threaded member, said studs being beveled at their outer faces, and said ring being beveled at its inner edge to engage the beveled outer faces of the studs.

ALEXANDER E. ZEESE.

In the presence of—
E. M. HARRINGTON,
E. B. LINN.